US008899544B2

(12) United States Patent
Meredith, Jr.

(10) Patent No.: US 8,899,544 B2
(45) Date of Patent: Dec. 2, 2014

(54) COMBINATION HOLD-DOWN CLAMP AND EXPANSION GUIDE APPARATUS FOR CABLE TRAYS

(75) Inventor: Thomas Max Meredith, Jr., Whitesburg, GA (US)

(73) Assignee: United Structural Products, LLC, Atlanta, GA (US)

( * ) Notice: Subject to any disclaimer, the term of this patent is extended or adjusted under 35 U.S.C. 154(b) by 260 days.

(21) Appl. No.: 13/418,564

(22) Filed: Mar. 13, 2012

(65) Prior Publication Data

US 2012/0235010 A1  Sep. 20, 2012

Related U.S. Application Data (60) Provisional application No. 61/452,472, filed on Mar. 14, 2011.

(51) Int. Cl.
*A47B 97/00* (2006.01)

(52) U.S. Cl.
USPC ........................................ 248/500; 248/309.1

(58) Field of Classification Search
None
See application file for complete search history.

(56) References Cited

U.S. PATENT DOCUMENTS

| 5,372,341 | A  | * | 12/1994 | Witherbee et al. | 248/49 |
| 6,173,848 | B1 | * | 1/2001  | Bravo            | 211/187 |
| 7,237,996 | B2 | * | 7/2007  | Vrana            | 411/180 |
| 2008/0310913 | A1 | * | 12/2008 | Urban et al.   | 403/404 |

* cited by examiner

*Primary Examiner* — Amy J Sterling
(74) *Attorney, Agent, or Firm* — Tucker Ellis LLP (57) ABSTRACT

A hold-down apparatus (10) for holding an associated cable tray on an associated support rod member includes a main body portion (100), U-shaped expansion and fixed clamp portions (102, 104), and first and second indicia (330, 332). The expansion clamp portion (102) is configured to loosely engage hold an associated bead of the cable tray relative to the associated support rod member and the fixed clamp portion (104) tightly holds the members together. The first indicia (330) is carried on a side of the main body portion (100) opposite from the fixed clamp portion (104) and the second indicia (320) is carried on a side of the main body portion (100) opposite from the expansion clamp portion (102). The indicia (330, 332) are visually distinguishable from the main body portion (100) for indicating an orientation of the fixed and expansion clamp portions (102, 104) relative to the associated cable tray.

22 Claims, 7 Drawing Sheets

COMBINATION HOLD-DOWN CLAMP AND EXPANSION GUIDE APPARATUS FOR CABLE TRAYS

CROSS REFERENCE TO RELATED APPLICATIONS

This application claims priority to U.S. Provisional Patent Application No. 61/452,472, filed Mar. 14, 2011.

BACKGROUND

Cable trays are, in general, support structures used in commercial and other buildings and in connection with other structures to support or otherwise carry long runs of electrical wiring, conduit and the like relative to the buildings or other structures. A typical cable tray comprises a pair of parallel elongate rails connected by a plurality of cross members spaced apart along the length of the parallel rails. The long runs of electrical wiring, conduit and the like are laid into the cable tray along the length of the parallel rails and transverse the plurality of spaced apart cross members.

The cable trays themselves are, in general, supported relative to fixed structures and commercial or other buildings by a series of parallel support bars suspended at intervals and spaced lengthwise of the cable tray. The cable tray rests on these support bars and is held in position on the bars by hold-down members which are affixed to the support bars by suitable fasteners such as threaded bolts and captive nuts or the like. These hold-down members are intended to hold the cable tray on the support bars and to prevent lateral shifting of the cable tray relative to the support bars.

One type of hold-down member prevalent in the industry is functional to rigidly clamp a cable tray against its support. These are commonly referred to as fixed clamps. Another common type of hold-down member holds the cable tray loosely on the support bars to permit selective relative movement between the cable tray and support bars necessitated largely by thermal expansion and contraction of the cable tray due to temperature variations. These are commonly referred to as expansion clamps. Accordingly, in practice, in order to permit relative movement between the cable tray and the support bars in selected regions along the length of the cable tray, several expansion clamps are used in the selected regions between pairs of fixed clamps on the ends of the regions. In some applications, as many as dozens of expansion clamps may be used in the selected expansion regions between pairs of fixed clamps. It is to be appreciated that a run of a cable tray system may span several expansion regions along its length.

For many reasons including economy, ease of use, and a reduced parts list, it is preferable to have a single "combination" hold-down member which is selectively functional in both capacities. Combination hold-down members can be selectively applied in either a clamping (fixed) mode or non-clamping (expansion) mode.

It is extremely important, however, to correctly install these combination hold-down members in the clamping mode when it is desired to fixedly clamp the cable tray to the support bar(s) and, correspondingly, to install the combination hold-down members in the non-clamping mode when it is desired to loosely clamp the cable tray to the support bar(s). Misapplication of the hold-down members could adversely interfere with providing for the required relative movement between the cable tray and the support bars in the selected designated regions wherein a failure of the connections, a buckling of the cable tray or the like could occur as the cable tray expands, contracts, and vibrates relative to the support.

Some applications do not lend themselves to close post-installation inspection such as for example high overhead uses. Accordingly, it is difficult to visually verify that the hold-down members are properly installed in the prescribed modalities along the length of the cable tray.

BRIEF SUMMARY

The present application is directed to a combination hold-down clamp and expansion guide apparatus for use in associated cable tray systems or the like for holding an associated cable tray on an associated support. In general, the apparatus comprises a main body portion having an expansion clamp portion, a fixed clamp portion, first indicia for providing a first signal, preferable visible, indicating a tight clamped orientation of the apparatus relative to the associated cable tray system, and second indicia for providing a second signal, preferable visible, indicating a loose clamped orientation of the apparatus relative to the associated cable tray system.

In one embodiment, the expansion clamp portion and the second indicia are disposed on relative opposite sides of the main body portion, and the fixed clamp portion and the first indicia are also disposed on relative opposite sides of the main body portion. In this way, the first indicia is readily visible when the fixed clamp portion is engaged with the cable tray, and the second indicia is readily visible when the loose clamp portion is loosely or slideably engaged with the cable tray.

In one particular example embodiment, the expansion clamp and fixed clamp portions are on opposite first and second ends of the main body portion. Each of the expansion and fixed clamp portions include indicia for providing a signal, preferable visible, indicating an orientation of the apparatus relative to the associated cable tray system. In this embodiment, the first indicia for providing the first signal indicating the tight clamped orientation of the apparatus relative to the associated cable tray system is provided on the first side of the main body. Conversely, the second indicia for providing the second signal indicating the loose clamped orientation of the apparatus relative to the associated cable tray system is provided on the second side of the main body. In this way, the first indicia on the first side is readily visible when the fixed clamp portion on the second side is engaged with the cable tray. Also in this way, the second indicia on the second side is readily visible when the expansion clamp portion on the first side is loosely or slideably engaged with the cable tray.

The indicia may be, for example, red and green provided on the opposite ends of the apparatus, respectively, or any other markings as may be desired. The indicia may also be, for example, any color different than the color of the main body portion, of may further be or have any textural characteristics which may be visually distinguishable from the texture, color or any other visual features of the main body portion so that human or other observer means may readily distinguish the orientation, and thus functional application of the combination hold-down clamp and expansion guide apparatus.

The expansion clamp portion has a generally hook shaped conformation and has a size and overall structure to loosely hold a bead formation provided on the outer edge of a flange of the associated cable tray system relative to a support bar of the cable tray system, wherein the expansion clamp portion loosely engages the bead to permit limited relative movement between the flange and the support bar.

The fixed clamp portion also has a generally hook shaped conformation and has a size and overall structure to fixedly hold a bead formation provided on the outer edge of a flange of the associated cable tray system relative to a support bar of the cable tray system, wherein the fixed clamp portion tightly engages the bead to prevent relative movement between the flange and the support bar.

In one form of the example embodiment described, a hold-down apparatus is provided for holding an associated cable tray on an associated support rod member, the cable tray being of the type having a pair of generally parallel rails with flanges extending lengthwise of the rails adapted to bear on the support rod member with the flanges defining an elongate bead portion extending lengthwise of the flanges and with the flanges extending generally transversely with respect to the associated support rod member. The hold-down apparatus comprises a main body portion, an expansion clamp portion carried by the main body portion, a fixed clamp portion carried by the main body portion, first indicia carried on a side of the main body portion opposite from the fixed clamp portion, and second indicia carried on a side of the main body portion opposite from the expansion clamp portion. The expansion clamp portion has a generally downwardly directed U-shaped construction and is configured to selectively loosely engage and slidably hold the associated bead of the associated cable tray relative to the associated support rod member. Similarly, the fixed clamp portion has a generally downwardly directed U-shaped construction and is configured to selectively tightly engage and tightly hold the associated bead of the associated cable tray relative to the associated support rod member. The first indicia is distinguishable from the main body portion for indicating an orientation of the fixed clamp portion relative to the associated cable tray. Similarly, the second indicia is distinguishable from the main body portion for indicating an orientation of the expansion clamp portion relative to the associated cable tray.

In another form of the example embodiment described, the main body portion of the hold-down apparatus for holding the associated cable tray on an associated support rod member comprises a substantially planar main central body portion defining a flat top surface and a flat bottom surface on opposite sides thereof. The expansion clamp portion comprises a first inner shoulder defined by the body, a first arm beam member extending outwardly from the body, a downwardly directed first hook member carried on a distal end of the first arm beam member, and a first outer shoulder defined by a portion of the hook member directed towards the first inner shoulder, wherein the first arm beam member defines a substantially planar first roof surface disposed a predetermined distance A from a one of the flat top surface or the flat bottom surface of the hold-down device body. The fixed clamp portion comprises a second inner shoulder defined by the body, a second arm beam member extending outward from the body, a downwardly directed second hook member carried on a distal end of the second arm beam member, and a second outer shoulder defined by a portion of the second hook member directed towards the second inner shoulder, wherein the second arm beam member defines a substantially planar second roof surface disposed a predetermined distance X from a one of the flat top surface or the flat bottom surface of the hold-down device body.

In yet another form of the example embodiment described, the first arm beam member defines a substantially planar first roof surface disposed a predetermined distance A from the flat bottom surface of the hold-down device body, and, the fixed clamp portion comprises a second inner shoulder defined by the body, a second arm beam member extending outward from the body, a downwardly directed second hook member carried on a distal end of the second arm beam member, and a second outer shoulder defined by a portion of the second hook member directed towards the second inner shoulder, wherein the second arm beam member defines a substantially planar second roof surface disposed a predetermined distance X from the flat bottom surface of the hold-down device body less than the predetermined distance A from the substantially planar first roof surface to the flat bottom surface of the hold-down device body.

DETAILED DESCRIPTION OF THE EXAMPLE EMBODIMENTS

Figure 1:
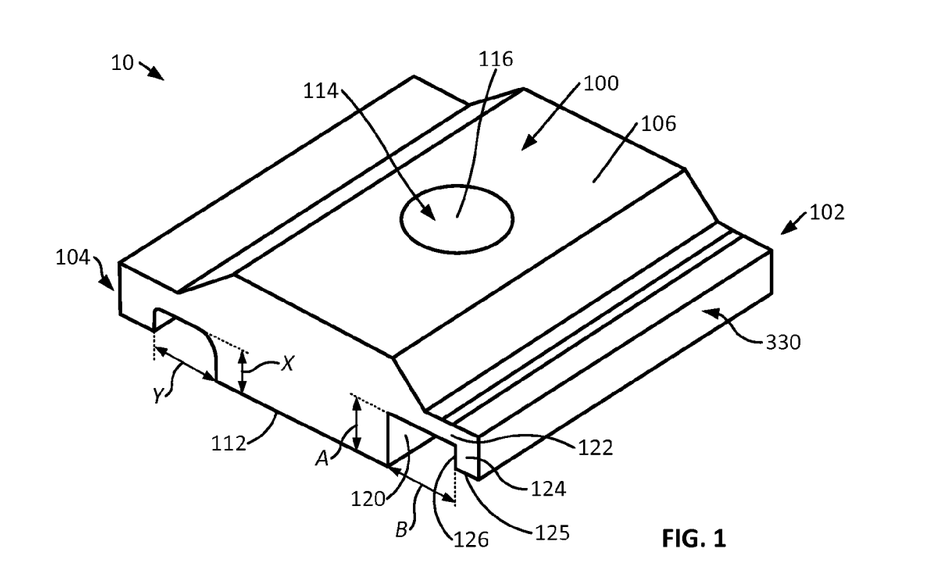
FIG. 1 is a perspective view of a hold-down device body in accordance with an example embodiment disposed in an orientation showing in the foreground an expansion clamp portion of the device body.
Figure 2:
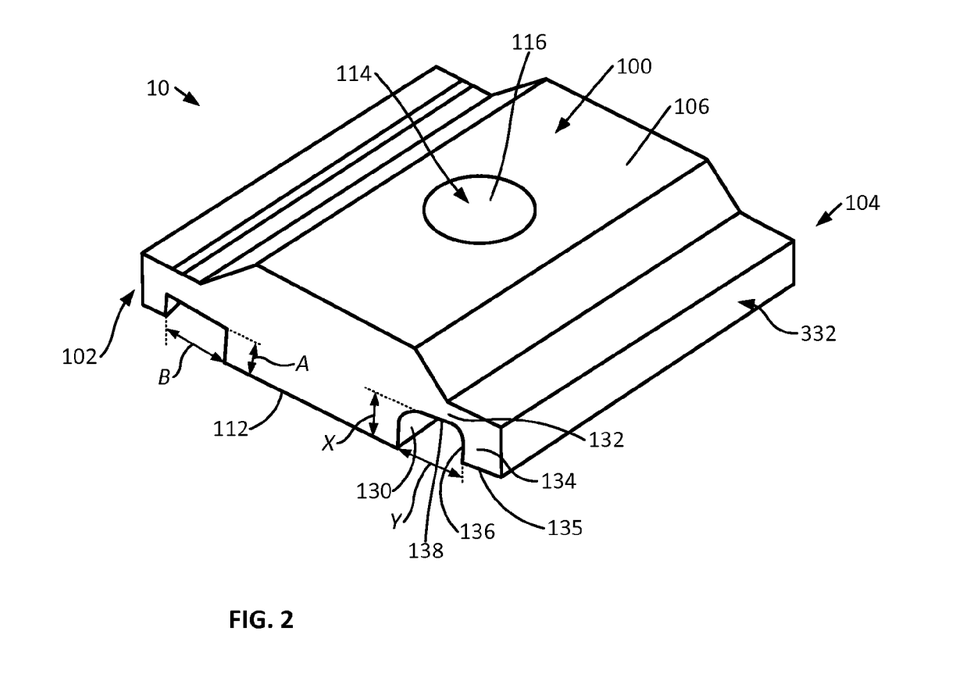
FIG. 2 is a perspective view of the hold-down device body in accordance with the example embodiment disposed in an orientation showing in the foreground a fixed clamp portion of the device body.

With reference now to the Figures wherein the showings are for purposes of illustrating an example embodiment only, and not for purposes of limiting the scope of the claims to the inventions herein, FIGS. 1 and 2 present perspective views, respectively, of a hold-down device 10 formed in accordance with an example embodiment disposed in FIG. 1 an orientation showing a device body 100 carrying an expansion clamp portion 102 of the device body 100 in the foreground, and in FIG. 2 showing a fixed clamp portion 104 in the foreground and being carried by the device body 100. As illustrated, in the example embodiment, the expansion and fixed clamp portions 102, 104 are formed integrally with the hold-down device body 100 and extend outwardly in opposite directions from a main central body portion 106 of the device body 100. However, it is to be appreciated that separate expansion and fixed clamp portions 102, 104 can be provided and attached to the main body 100, rather than being formed integrally therewith, such as by fastening, gluing, bonding or otherwise attaching the expansion and fixed clamp portions 102, 104 to the main body 100 in one or more manufacturing steps. In addition, the separate expansion and fixed clamp portions 102, 104 can be individually stained, dyed, coated, plated or otherwise colored in a preliminary manufacturing step and thereafter attached with the main body portion, whereby the different colors or other visible differences of the expansion and fixed clamp portions 102, 104 may provide a visible indicia of an orientation of the hold-down device 10 of the example embodiment relative to the surrounding associated structures such as for example the cable tray.

In the example embodiment illustrated, the main central body portion 106 of the device body 100 is substantially planar and defines flat top 110 and bottom 112 surfaces on opposite sides thereof. A central aperture 114 defines a substantially cylindrical opening 116 extending between the top 110 and bottom 112 surfaces of the main central body portion. The cylindrical opening 116 is configured to selectively receive an associated clamping fastener to be described in greater detail below.

With continued reference to FIGS. 1 and 2 but with particular reference to FIG. 1, the expansion clamp portion 102 of the example hold-down clamp body 100 has a generally downwardly directed U-shaped construction comprising a first inner shoulder 120 defined by the body 100, a first arm beam member 122 extending outward from the body 100, a downwardly directed first hook member 124 carried on a distal end of the first arm beam member 122, and a first outer shoulder 126 defined by a portion of the hook member 124 directed towards the first inner shoulder 120. The first arm beam member 122 defines a substantially planar first roof surface 128. For reasons to be described in greater detail below, the planar first roof surface 128 is formed a predetermined distance A from the first bottom surface 112 of the hold-down device body 100. In addition, for reasons to be described in greater detail below, the first outer shoulder 126 is formed a predetermined distance B from the first inner shoulder 120 of the hold-down device body 100.

In one particular example embodiment, the planar first roof surface 128 is formed a predetermined distance A from the first bottom surface 112 of the hold-down device body 100 of about A=0.260 inches (6.604 mm.). Also in the particular example embodiment, the first outer shoulder 126 is formed a predetermined distance B from the first inner shoulder 120 of the hold-down device body 100 of about B=0.293 inches (7.442 mm.). In addition, a distance between a bottom surface 125 of the first arm beam member 122 and the first bottom surface 112 of the main body member 100 is about 0.130 inches (3.302 mm.).

With still further continued reference to FIGS. 1 and 2 but with particular reference now to FIG. 2, the fixed clamp portion 104 of the example hold-down clamp body 100 has a generally downwardly directed U-shaped construction comprising a second inner shoulder 130 defined by the body 100, a second arm beam member 132 extending outward from the body 100, a downwardly directed second hook member 134 carried on a distal end of the second arm beam member 132, and a second outer shoulder 136 defined by a portion of the second hook member 134 directed towards the second inner shoulder 130. The second arm beam member 132 defines a substantially planar second roof surface 138. For reasons to be described in greater detail below, the planar second roof surface 138 is formed a predetermined distance X from the second bottom surface 112 of the hold-down device body 100. In addition, for reasons to be described in greater detail below, the second outer shoulder 136 is formed a predetermined distance Y from the second inner shoulder 120 of the hold-down device body 100.

In one particular example embodiment, the planar second roof surface 138 is formed a predetermined distance X from the first bottom surface 112 of the hold-down device body 100 of about X=0.186 inches (4.724 mm.). Also in the particular example embodiment, the second outer shoulder 136 is formed a predetermined distance Y from the second inner shoulder 130 of the hold-down device body 100 of about Y=0.270 inches (6.858 mm.). In addition, a distance between a bottom surface 135 of the second arm beam member 132 and the first bottom surface 112 of the main body member 100 is about 0.085 inches (2.159 mm.).

In a further embodiment (not shown) either one or both of the expansion or fixed clamp portions 102, 104 may comprise generally upwardly directed U-shaped configurations wherein the predetermined distances A, B are referenced from the top surface 106 of the body 106 rather than the bottom surface 112 of the body 106.

In a still further embodiment (not shown), both of the expansion and fixed clamp portions 102, 104 are disposed on the same side of the main body portion wherein one of the expansion or fixed clamp portions 102, 104 may comprise generally upwardly directed U-shaped configuration wherein the appropriate one of the predetermined distances A, B is referenced from the top surface 106 of the body 106, and the other of the expansion or fixed clamp portions 102, 104 may comprise generally downwardly directed U-shaped configuration wherein the appropriate one of the predetermined distances A, B is referenced from the bottom surface 112 of the body 106.

Figure 3:
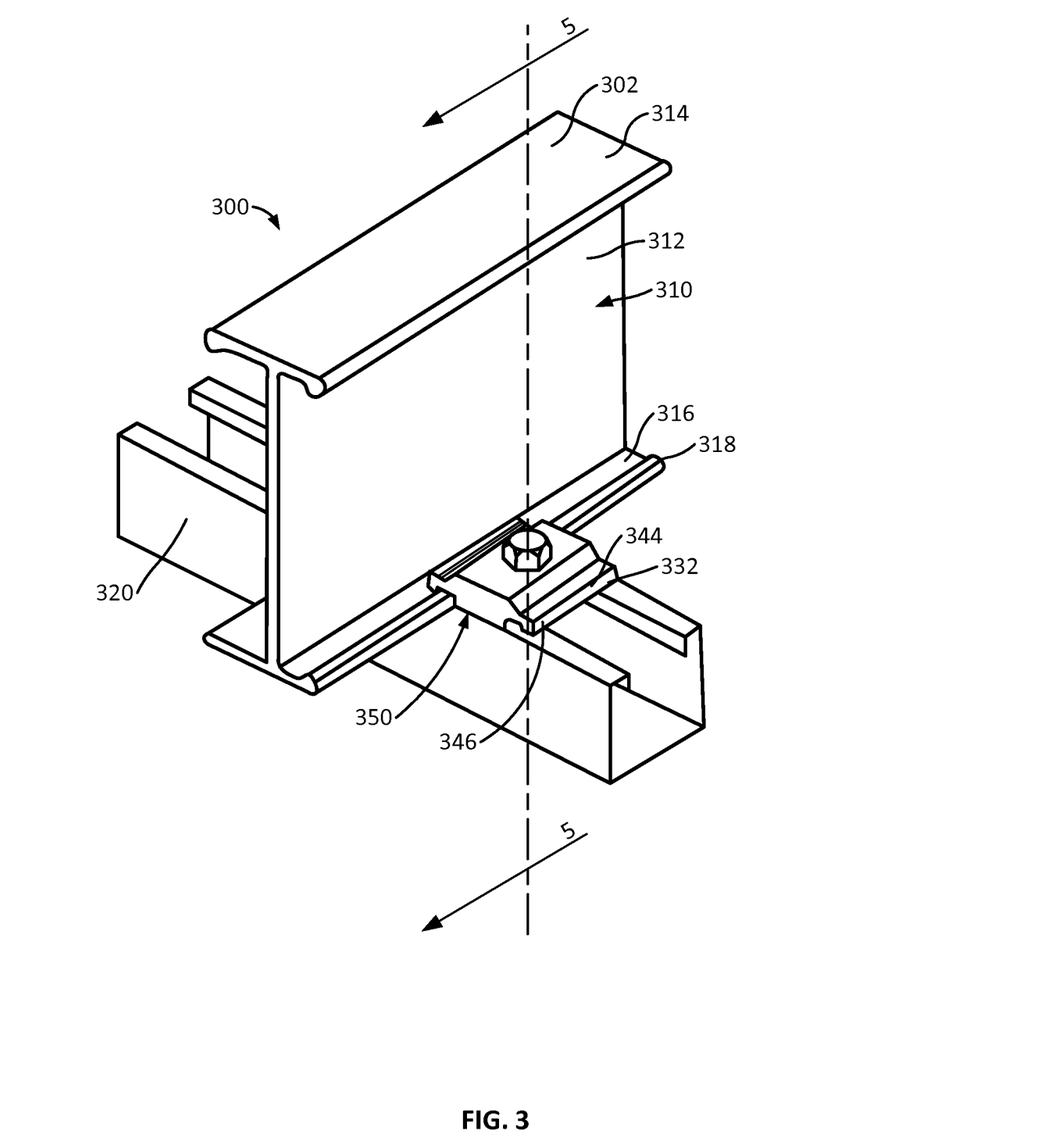
FIG. 3 is a perspective view of a portion of an associated cable tray support system utilizing the hold-down device body of FIGS. 1 and 2 in the relative expansion clamp position.
Figure 4:
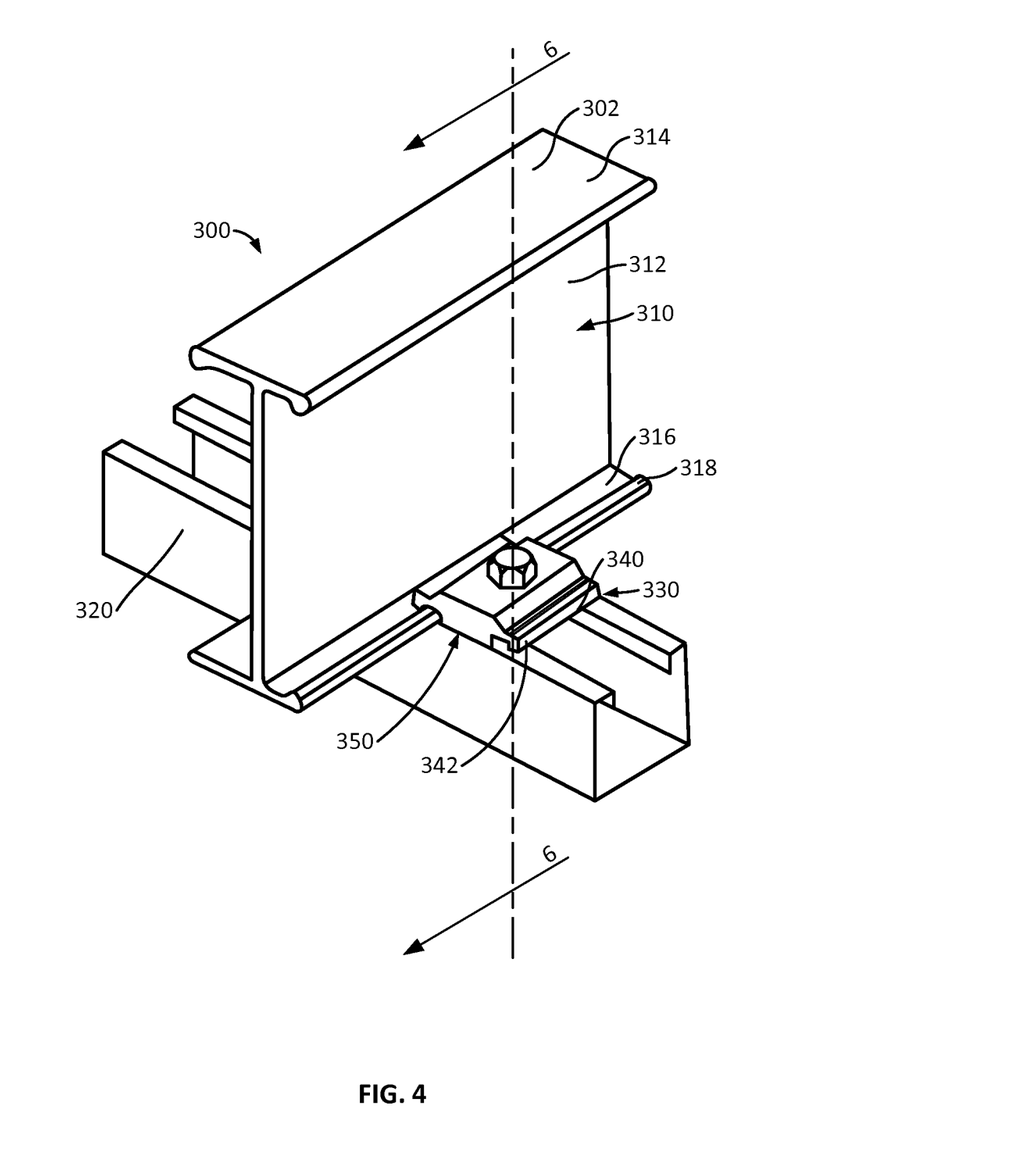
FIG. 4 is a perspective view of a portion of an associated cable tray support system utilizing the hold-down device body of FIGS. 1 and 2 in the relative fixed clamping position.

The example embodiment is shown in perspective view FIGS. 3 and 4 used with an associated support system indicated generally by the reference numeral 300, is shown supporting a run of associated cable tray indicated generally at 302. As illustrated, the cable tray 302 is of the type comprising a pair (only one shown) of generally parallel side rails, each designated 310. The side rails may be interconnected by a series of parallel, spaced apart cross members (not shown). The cross-sectional sectional shape of the rails 310 will vary depending on the type of cable tray. For example, the cable tray 302 shown in the drawings has a rail 310 formed from an aluminum I beam having a vertical web 312 and upper and lower horizontal flanges indicated at 314 and 316, respectively, extending laterally from the web 312 on opposite sides of the web. The cable tray 302 is adapted to carry various types of elongate objects as desired such as, for example, conduit or the like. The support system 300 further comprises a series (only one shown) of support bars, generally indicated at 320, adapted to be suspended such as by associated rods (not sown) at intervals spaced lengthwise of the cable tray 302 and with the support bars extending generally cross-wise relative to the rails 310 of the cable tray.

The hold-down body 100 is used in a hold-down system 350 including a fastener 352 and other components to be described in greater detail below for operatively coupling the one or more rail(s) 310 of the cable support system 300 with the one or more support bar(s) 320. FIG. 3 illustrates the hold-down system 350 in an expansion or non-clamping mode of use, and FIG. 4 illustrates the hold-down system 350 in a fixed or clamping mode of use. In accordance with an aspect of the example embodiment, an outer surface 125 of the first hook member 124 is provided with first visual indicia 330 configured to provide a visible indication of an orientation of the expansion clamp portion 102 of the hold-down device 100 relative to the associated cable tray 302 and relative to the fixed clamp portion 104 of the device 100. In the example embodiment, the first visual indicia 330 is a colored coating 340 in the form of a green stripe 342 applied to the outer surface 125 of the first hook member 124. Similarly, accordance with this aspect of the example embodiment, an outer surface 135 of the second hook member 134 is provided with second visual indicia 332 configured to provide a visible indication of an orientation of the fixed clamp portion 104 of the hold-down device 100 relative to the associated cable tray 302 and relative to the expansion clamp portion 102 of the device 100. In the example embodiment, the second visual indicia 332 is a colored coating 344 in the form of a red stripe 346 applied to the outer surface 135 of the second hook member 134. As noted above, however, the indicia 330, 332 may also be, for example, any color different than the color of the main body portion, of may further be or have any textural characteristics which may be visually distinguishable from the texture, color or any other visual features of the main body portion so that human or other observer means may readily distinguish the orientation, and thus functional application of the combination hold-down clamp and expansion guide apparatus.

Figure 5:
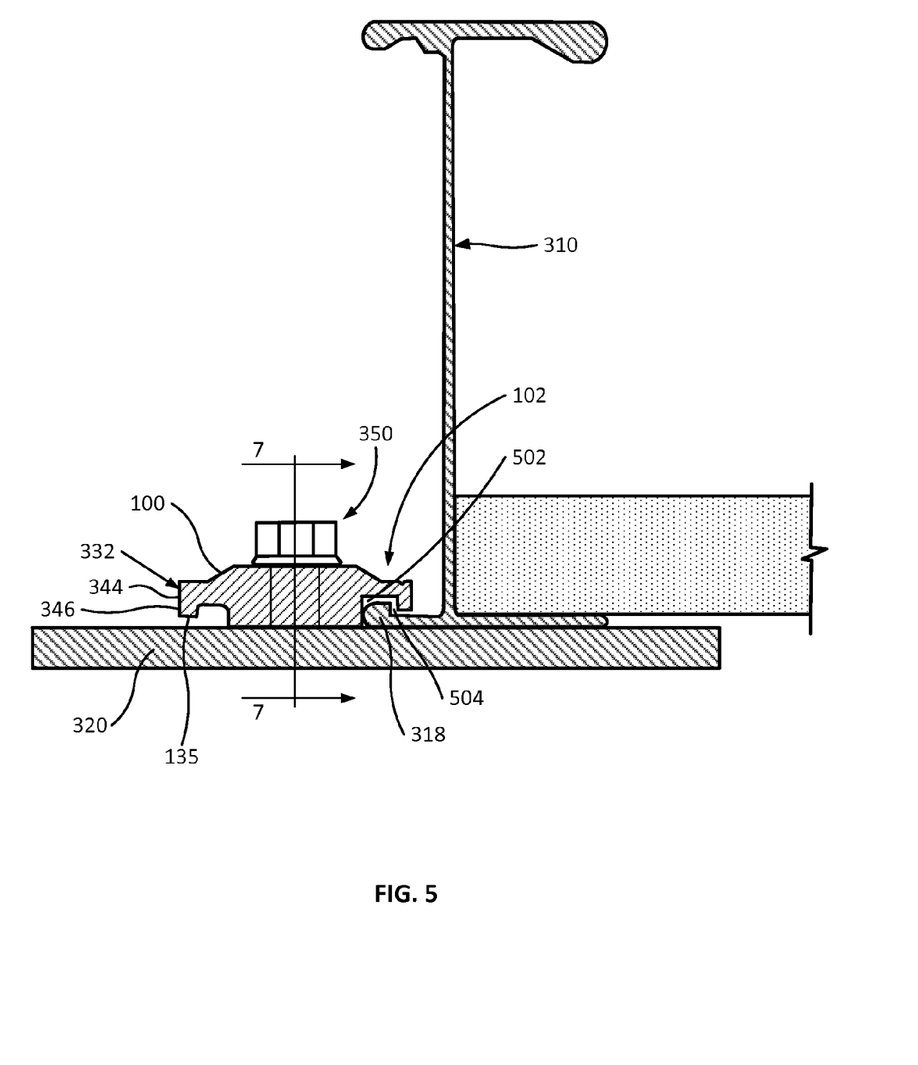
FIG. 5 is an enlarged vertical sectional view of the portion of a cable tray support system taken along line 5-5 of FIG. 3 illustrating the hold-down device body of FIGS. 1 and 2 in the relative expansion clamp position.
Figure 6:
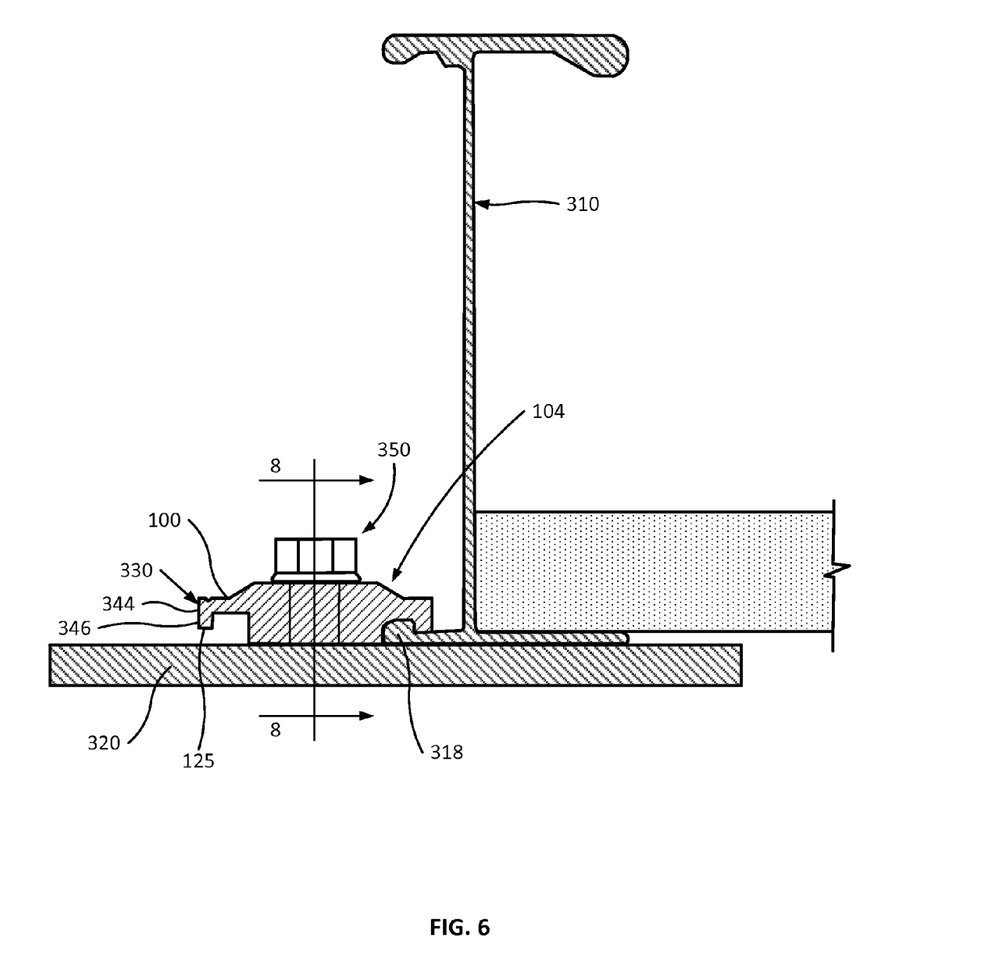
FIG. 6 is an enlarged vertical sectional view of the portion of a cable tray support system taken along line 6-6 of FIG. 4 illustrating the hold-down device body of FIGS. 1 and 2 in the relative fixed clamping position.

FIG. 5 is an enlarged vertical sectional view of the portion of a cable tray support system 300 taken along line 5-5 of FIG. 3 illustrating the hold-down system 350 including the hold-down device body 100 in the expansion clamp position, and FIG. 6 is an enlarged vertical sectional view of the portion of a cable tray support system taken along line 6-6 of FIG. 4 illustrating the hold-down device body 100 in the clamping position. As illustrated in those Figures, it is to be appreciated that the lower horizontal flange of standard side rails includes a bead 318 on an outer edge thereof. In FIG. 5, the bead 318 fits loosely within the space defined by the downwardly directed U-shaped construction of the expansion clamp portion 102 comprising the first inner shoulder 120 defined by the body 100, the first arm beam member 122 extending outward from the body 100, the downwardly directed first hook member 124 carried on the distal end of the first arm beam member 122, and the first outer shoulder 126 defined by the portion of the hook member 124 directed towards the first inner shoulder 120. Specifically, the predetermined distance A from the first bottom surface 112 of the hold-down device body 100 to the roof surface 128 is greater than a vertical height of the bead 318 thereby defining a first gap or free space 502 between the roof surface 128 and the vertical extent of the height of the bead 318 of the associated cable tray 302. Also, the predetermined distance B from the first outer shoulder 126 to the first inner shoulder 112 of the hold-down device body 100 greater than a horizontal width of the bead 318 thereby defining a second gap or free space 504 between the first inner and outer shoulders 120, 126 and the horizontal extent of the width of the bead 318 of the associated cable tray 302.

In FIG. 6, the bead 318 is held tightly within the space defined by the downwardly directed U-shaped construction of the fixed portion 104 comprising the second inner shoulder 130 defined by the body 100, the second arm beam member 132 extending outward from the body 100, the downwardly directed second hook member 134 carried on the distal end of the second arm beam member 132, and the second outer shoulder 136 defined by the portion of the second hook member 134 directed towards the second inner shoulder 130. Specifically, the predetermined distance X from the bottom surface 112 of the hold-down device body 100 to the roof surface 138 is slightly less than the vertical height of the bead 318 of the associated cable tray 302, thereby forming an interference connection. Also, the predetermined distance Y from the second outer shoulder 136 to the second inner shoulder 130 of the hold-down device body 100 slightly less than the horizontal width of the bead 318 of the associated cable tray 302 thereby forming an interference connection.

Figure 7:
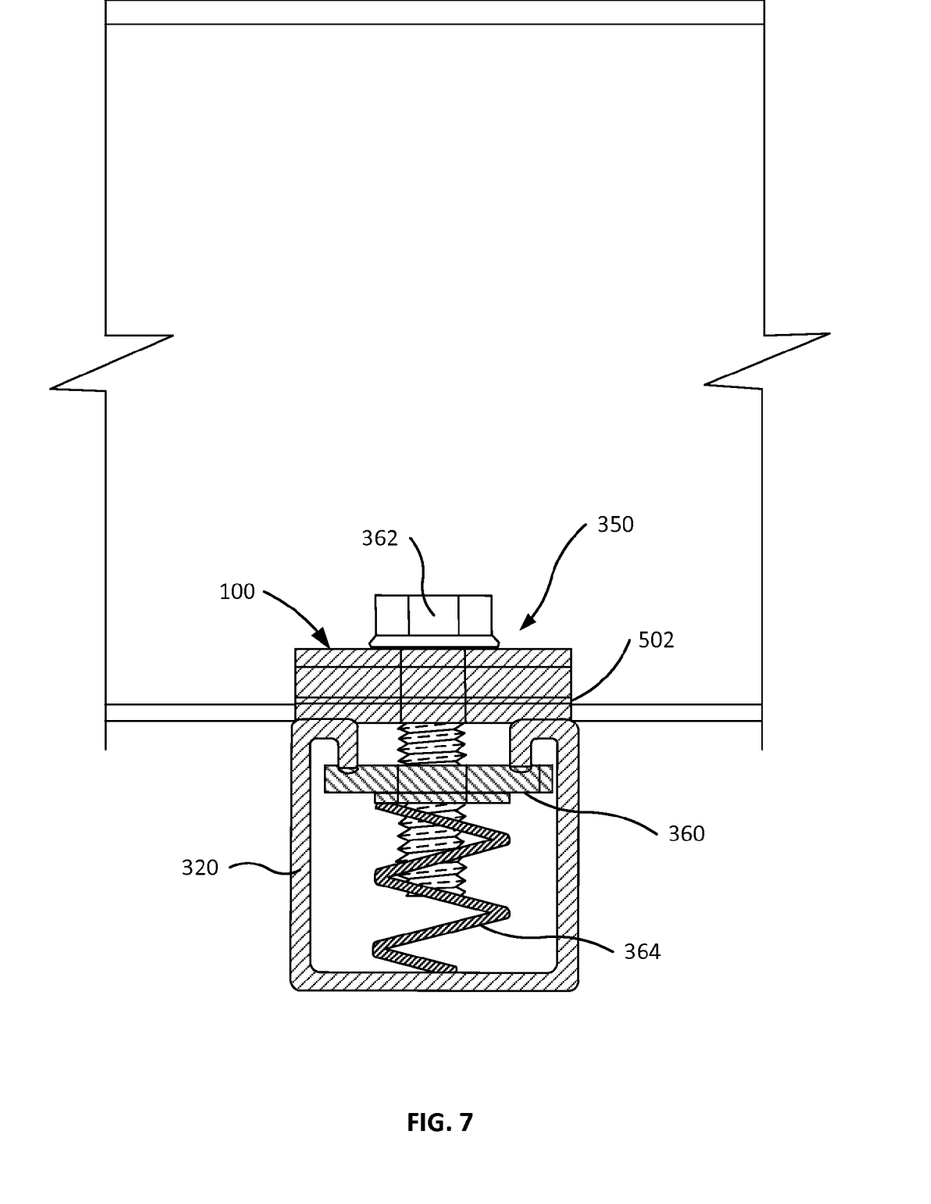
FIG. 7 is an enlarged vertical sectional view of the portion of a cable tray support system taken along line 7-7 of FIG. 5 illustrating the hold-down device body together with other components of a hold-down device system in the relative expansion clamp position; and, FIG. 8 is an enlarged vertical sectional view of the portion of a cable tray support system taken along line 8-8 of FIG. 6 illustrating the hold-down device body together with other components of the hold-down device system in the relative clamping position.
Figure 8:
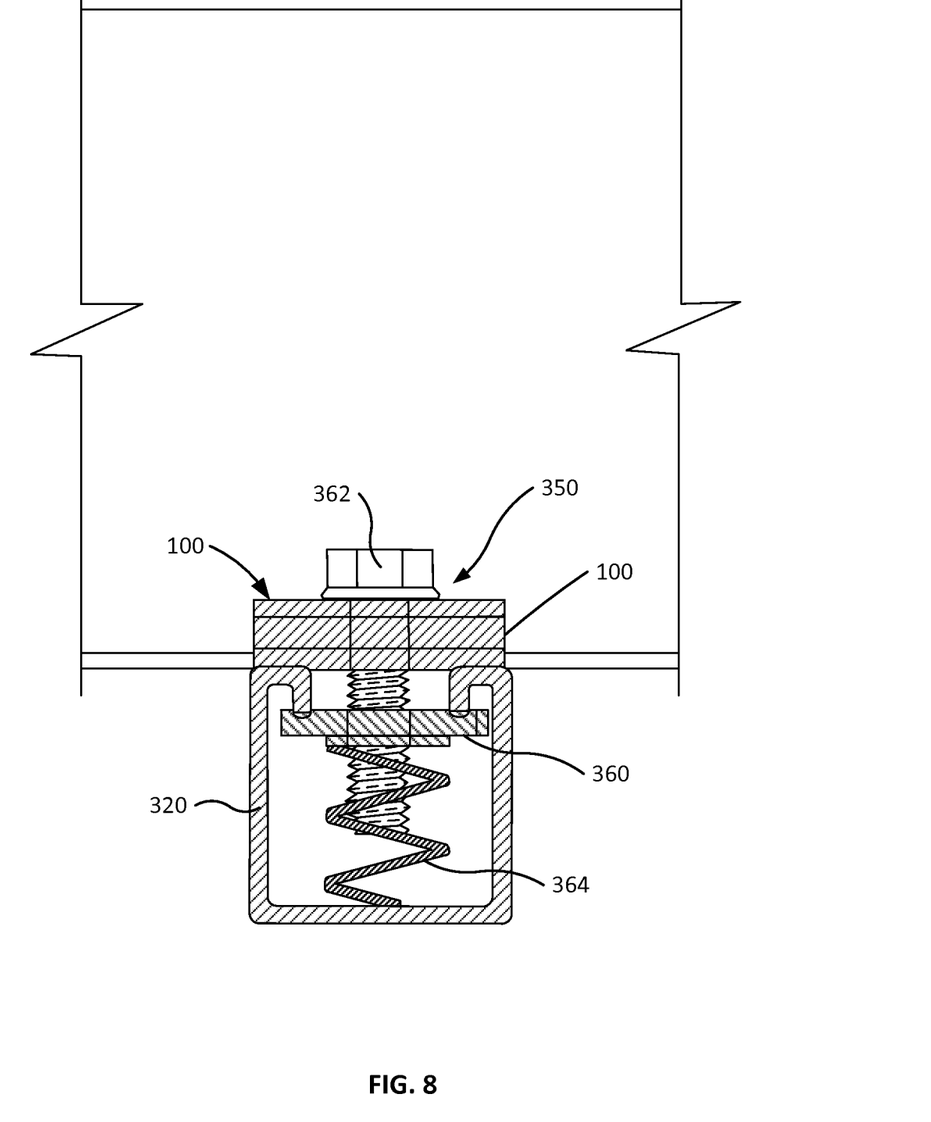

In its preferred form, the main body 100 of the hold-down system 350 is formed of a rigid material such as metal, but preferably aluminum. As shown best in FIGS. 7 and 8, the hold-down system 350 includes an internally threaded rectangular washer 360 configured to receive an elongate fastener such as a bolt 362, and a biasing member preferably a spring 364.

The invention claimed is:

1. A hold-down apparatus for holding an associated cable tray on an associated support rod member, the cable tray being of the type having a pair of generally parallel rails with flanges extending lengthwise of the rails and being adapted to bear on the support rod member with the flanges defining an elongate bead extending lengthwise of the flanges, the hold-down apparatus comprising:
   a main body portion;
   an expansion clamp portion carried by the main body portion, the expansion clamp portion having a generally downwardly directed U-shaped configuration and being configured to selectively loosely engage and slidably hold the associated bead of the associated cable tray relative to the associated support rod member; and
   a fixed clamp portion carried by the main body portion, the fixed clamp portion having a generally downwardly directed U-shaped configuration and being configured to selectively tightly engage and tightly hold the associated bead and flange of the associated cable tray relative to the associated support rod member;
   wherein the main body portion comprises a substantially planar main central body portion defining on opposite sides thereof a top surface and a bottom surface;
   wherein the expansion clamp portion comprises a first inner shoulder defined by the main body portion, a first arm beam member extending outwardly from the main body portion, a downwardly directed first hook member carried on a distal end of the first arm beam member, and a first outer shoulder defined by a portion of the first hook member directed towards the first inner shoulder, wherein the first arm beam member defines a substantially planar first roof surface disposed a predetermined distance from one of the flat top surface or the flat bottom surface of the main central body portion;
   wherein the fixed clamp portion comprises a second inner shoulder defined by the main body portion, a second arm beam member extending outward from the main body portion, a downwardly directed second hook member carried on a distal end of the second arm beam member, and a second outer shoulder defined by a portion of the second hook member directed towards the second inner shoulder, wherein the second arm beam member defines a substantially planar second roof surface disposed a predetermined distance from one of the flat top surface or the flat bottom surface of the main central body portion.

2. The hold-down apparatus according to claim 1, wherein:
   the expansion clamp and fixed clamp portions are oriented relative to the main body portion in opposite relative directions.

3. The hold-down apparatus according to claim 2, further comprising:
   first indicia carried on a side of the main body portion opposite from the fixed clamp portion, the first indicia being distinguishable from the main body portion for indicating an orientation of the fixed clamp portion relative to the associated cable tray; and,
   second indicia carried on a side of the main body portion opposite from the expansion clamp portion, the second indicia being distinguishable from the main body portion for indicating an orientation of the expansion clamp portion relative to the associated cable tray;

wherein:

the first indicia is a portion having a first color carried on a side of the main body portion opposite from the fixed clamp portion, the first color being visually distinguishable from the main body portion for indicating an orientation of the fixed clamp portion relative to the associated cable tray; and, the second indicia is a portion having a second color carried on a side of the main body portion opposite from the expansion clamp portion, the second color being visually distinguishable from the main body portion for indicating an orientation of the expansion clamp portion relative to the associated cable tray.

4. The hold-down apparatus according to claim 3, wherein:
the first color of the first indicia is visually distinguishable from the second color of the second indicia for indicating an orientation of the expansion clamp portion relative to the associated cable tray.

5. The hold-down apparatus according to claim 1, wherein:
the expansion clamp and fixed clamp portions are formed integrally with the main body portion.

6. A hold-down apparatus for holding an associated cable tray on an associated support rod member, the cable tray having a pair of generally parallel rails with flanges extending lengthwise of the rails and being adapted to bear on the support rod member with the flanges defining an elongate bead extending lengthwise of the flanges, the hold-down apparatus comprising:

a main body portion;

an expansion clamp portion carried by the main body portion, the expansion clamp portion having a generally downwardly directed U-shaped configuration and being configured to selectively loosely engage and slidably hold the associated bead of the associated cable tray relative to the associated support rod member;

a fixed clamp portion carried by the main body portion, the fixed clamp portion having a generally downwardly directed U-shaped configuration and being configured to selectively tightly engage and tightly hold the associated bead and flange of the associated cable tray relative to the associated support rod member;

first indicia carried on a side of the main body portion opposite from the fixed clamp portion, the first indicia being distinguishable from the main body portion for indicating an orientation of the fixed clamp portion relative to the associated cable tray; and, second indicia carried on a side of the main body portion opposite from the expansion clamp portion, the second indicia being distinguishable from the main body portion for indicating an orientation of the expansion clamp portion relative to the associated cable tray, wherein:

the main body portion comprises a substantially planar main central body portion defining on opposite sides thereof a flat top surface and a flat bottom surface;

the expansion clamp portion comprises a first inner shoulder defined by the body portion, a first arm beam member extending outwardly from the body portion, a downwardly directed first hook member carried on a distal end of the first arm beam member, and a first outer shoulder defined by a portion of the first hook member directed towards the first inner shoulder, wherein the first arm beam member defines a substantially planar first roof surface disposed a predetermined distance A from a one of the flat top surface or the flat bottom surface of the hold-down device body portion; and, the fixed clamp portion comprises a second inner shoulder defined by the body portion, a second arm beam member extending outward from the body portion, a downwardly directed second hook member carried on a distal end of the second arm beam member, and a second outer shoulder defined by a portion of the second hook member directed towards the second inner shoulder, wherein the second arm beam member defines a substantially planar second roof surface disposed a predetermined distance X from a one of the flat top surface or the flat bottom surface of the main central body portion.

7. The hold-down apparatus according to claim 6, wherein:
the first arm beam member defines a substantially planar first roof surface disposed a predetermined distance A from the flat bottom surface of the main central body portion; and, the second arm beam member defines a substantially planar second roof surface disposed a predetermined distance X from the flat bottom surface of the main central body portion.

8. The hold-down apparatus according to claim 7, wherein:
the predetermined distance A from the substantially planar first roof surface to the flat bottom surface of the hold-down device body portion is greater than the predetermined distance X from the substantially planar second roof surface to the flat bottom surface of the main central body.

9. The hold-down apparatus according to claim 8, wherein:
the predetermined distance A from the substantially planar first roof surface to the flat bottom surface of the main central body portion is greater than a height of the elongate bead portion of the associated cable tray relative to the associated support bar member; and, the predetermined distance X from the substantially planar second roof surface to the flat bottom surface of the main central body portion is about the same or less than a height of the elongate bead portion of the associated cable tray relative to the associated support bar member.

10. The hold-down apparatus according to claim 6, wherein:
the first arm beam member defines a substantially planar first roof surface disposed a predetermined distance A from the flat bottom surface of the main central body portion; and, the second arm beam member defines a substantially planar second roof surface disposed a predetermined distance X from the flat top surface of the main central body portion.

11. The hold-down apparatus according to claim 10, wherein:
the predetermined distance A from the substantially planar first roof surface to the flat bottom surface of the main central body portion is greater than the predetermined distance X from the substantially planar second roof surface to the flat bottom surface of the main central body portion.

12. The hold-down apparatus according to claim 11, wherein:
the predetermined distance A from the substantially planar first roof surface to the flat bottom surface of the main central body portion is greater than a height of the elongate bead portion of the associated cable tray relative to the associated support bar member; and, the predetermined distance X from the substantially planar second roof surface to the flat bottom surface of the main central body portion is about the same or less than a height of the elongate bead portion of the associated cable tray relative to the associated support bar member.

13. A hold-down apparatus for holding an associated cable tray on an associated support rod member, the cable tray having a pair of generally parallel rails with flanges extending lengthwise of the rails and being adapted to bear on the support rod member with the flanges defining an elongate bead portion extending lengthwise of the flanges, the hold-down apparatus comprising:
   a main body portion;
   an expansion clamp portion carried by the main body portion, the expansion clamp portion having a generally downwardly directed U-shaped configuration and being configured to selectively loosely engage and slidably hold the associated bead of the associated cable tray relative to the associated support rod member;
   a fixed clamp portion carried by the main body portion, the fixed clamp portion having a generally downwardly directed U-shaped configuration and being configured to selectively tightly engage and tightly hold the associated bead and flange of the associated cable tray relative to the associated support rod member;
   first indicia carried on a side of the main body portion opposite from the fixed clamp portion the first indicia being distinguishable from the main body portion for indicating an orientation of the fixed clamp portion relative to the associated cable tray; and,
   second indicia carried on a side of the main body portion opposite from the expansion clamp portion, the second indicia being distinguishable from the main body portion for indicating an orientation of the expansion clamp portion relative to the associated cable tray;
   wherein the main body portion comprises a substantially planar main central body portion defining a flat top surface and a flat bottom surface on opposite sides thereof;
   wherein the expansion clamp portion comprises a first inner shoulder defined by the main central body portion, a first arm beam member extending outwardly from the main central body portion, a downwardly directed first hook member carried on a distal end of the first arm beam member, and a first outer shoulder defined by a portion of the hook member directed towards the first inner shoulder, wherein the first arm beam member defines a substantially planar first roof surface disposed a predetermined distance A from the flat bottom surface of the main central body portion; and,
   wherein the fixed clamp portion comprises a second inner shoulder defined by the main central body portion, a second arm beam member extending outward from the main central body portion, a downwardly directed second hook member carried on a distal end of the second arm beam member, and a second outer shoulder defined by a portion of the second hook member directed towards the second inner shoulder, wherein the second arm beam member defines a substantially planar second roof surface disposed a predetermined distance X from the flat bottom surface of the main central body portion less than the predetermined distance A from the substantially planar first roof surface to the flat bottom surface of the hold-down device body portion.

14. The hold-down apparatus according to claim 13, wherein:
   the second outer shoulder is formed a predetermined distance Y from the second inner shoulder of the main central body portion, wherein Y is about a width of the elongate bead portion of the associated cable tray; and, the first outer shoulder is formed a predetermined distance B from the first inner shoulder of the main central body portion, wherein B is larger than the width of the elongate bead portion of the associated cable tray.

15. The hold-down apparatus according to claim 13, wherein:
   the main body portion comprises a central aperture defining a substantially cylindrical opening extending in a direction substantially transverse planes defined by the top and bottom surfaces completely through the main central body portion between the top and bottom surfaces.

16. The hold-down apparatus according to claim 15, wherein:
   the expansion clamp and fixed clamp portions extend from the main body portion in opposite directions relative to the substantially cylindrical opening.

17. The hold-down apparatus according to claim 1, wherein:
   the main body portion comprises a central aperture defining a substantially cylindrical opening extending in a direction substantially transverse planes defined by the top and bottom surfaces completely through the main central body portion between the top and bottom surfaces.

18. The hold-down apparatus according to claim 17, further comprising:
   a fastener extending in the central aperture, the fastener being selectively matable with the associated support rod member and configured to draw the main body portion relative to the associated support rod member for i) tightly clamping the associated cable tray relative to the associated support rod member when the main body portion is in a first position relative to the associated cable tray, and ii) slidably holding the associated bead relative to the associated support rod member when the main body portion is in a second position relative to the associated cable tray.

19. A hold-down apparatus for holding an associated cable tray on an associated support rod member, the cable tray having a pair of generally parallel rails with flanges extending lengthwise of the rails and being adapted to bear on the support rod member with the flanges defining an elongate bead portion extending lengthwise of the flanges, the hold-down apparatus comprising:
   a main body portion comprising a central aperture defining a substantially cylindrical opening extending in a direction substantially transverse planes defined by top and bottom surfaces of the main body portion completely through a central body portion of the main body portion between the top and bottom surfaces;
   a fixed clamp portion carried by the main body portion, the fixed clamp portion having a generally downwardly directed U-shaped configuration and being configured when positioned in a first orientation relative to the associated cable tray to selectively tightly engage and tightly hold the associated bead and flange of the associated cable tray relative to the associated support rod member;
   an expansion clamp portion carried by the main body portion, the expansion clamp portion having a generally downwardly directed U-shaped configuration and being configured when positioned in a second orientation relative to the associated cable tray to selectively loosely engage and slidably hold the associated bead of the associated cable tray relative to the associated support rod member;

first indicia carried on a side of the main body portion opposite from the fixed clamp portion, the first indicia being distinguishable from the main body portion for indicating an orientation of the fixed clamp portion relative to the associated cable tray;

second indicia carried on a side of the main body portion opposite from the expansion clamp portion, the second indicia being distinguishable from the main body portion for indicating an orientation of the expansion clamp portion relative to the associated cable tray; and, a fastener extending in the central aperture, the fastener being selectively matable with the associated support rod member and configured to draw the main body portion relative to the associated support rod member for i) tightly clamping the associated cable tray relative to the associated support rod member when the main body portion is in the first orientation relative to the associated cable tray, and ii) slidably holding the associated bead relative to the associated support rod member when the main body portion is in the second orientation relative to the associated cable tray;

wherein the main body portion comprises a substantially planar main central body portion defining on opposite sides thereof a flat top surface and a flat bottom surface;

wherein the expansion clamp portion comprises a first inner shoulder defined by the main body portion, a first arm beam member extending outwardly from the main body portion, a downwardly directed first hook member carried on a distal end of the first arm beam member, and a first outer shoulder defined by a portion of the hook member directed towards the first inner shoulder, wherein the first arm beam member defines a substantially planar first roof surface disposed a predetermined distance A from a one of the flat top surface or the flat bottom surface of the main central body portion; and, wherein the fixed clamp portion comprises a second inner shoulder defined by the body portion, a second arm beam member extending outward from the main body portion, a downwardly directed second hook member carried on a distal end of the second arm beam member, and a second outer shoulder defined by a portion of the second hook member directed towards the second inner shoulder, wherein the second arm beam member defines a substantially planar second roof surface disposed a predetermined distance X from a one of the flat top surface or the flat bottom surface of the main central body portion.

20. A hold-down apparatus for holding an associated cable tray relative to an associated support member, the cable tray being of the type having a pair of generally parallel rails with flanges extending lengthwise of the rails and being adapted to bear on the support member with the flanges defining an elongate bead portion extending lengthwise of the flanges, the hold-down apparatus comprising:

a main body portion comprising a substantially planar main central body portion defining on opposite sides thereof a flat top surface and a flat bottom surface;

an expansion clamp portion carried by the main body portion, the expansion clamp portion having a generally U-shaped configuration oriented in a first direction relative to the main body portion and being configured to selectively loosely engage and slidably hold the associated bead of the associated cable tray relative to the associated support member, the expansion clamp portion being distinguishable from the main body portion for indicating an orientation of the fixed clamp portion relative to the associated cable tray; and a fixed clamp portion carried by the main body portion on a side of the main body portion opposite from the expansion clamp portion, the fixed clamp portion having a generally U-shaped configuration oriented in the first direction relative to the main body portion and being configured to selectively tightly engage and tightly hold the associated bead and flange of the associated cable tray relative to the associated support member, the fixed clamp portion being visually distinguishable from the main body portion for indicating a second orientation of the expansion clamp portion relative to the associated cable tray opposite from the first orientation relative to the associated cable tray;

wherein the expansion clamp portion comprises a first inner shoulder defined by the main body portion, a first arm beam member extending outwardly from the main body portion, a downwardly directed first hook-member carried on a distal end of the first arm beam member, and a first outer shoulder defined by a portion of the hook member directed towards the first inner shoulder, wherein the first arm beam member defines a substantially planar first roof surface disposed a predetermined distance A from a one of the flat top surface or the flat bottom surface of the main central body portion; and, the fixed clamp portion comprises a second inner shoulder defined by the main body portion, a second arm beam member extending outward from the main body portion, a downwardly directed second hook member carried on a distal end of the second arm beam member, and a second outer shoulder defined by a portion of the second hook member directed towards the second inner shoulder, wherein the second arm beam member defines a substantially planar second roof surface disposed a predetermined distance X from a one of the flat top surface or the flat bottom surface of the main central body portion.

21. The hold-down apparatus according to claim 1, wherein:

a predetermined distance from the substantially planar second roof surface defined by the second arm beam member to the top surface of the main body portion is less than a distance from the substantially planar first roof surface defined by the first arm beam member to the bottom surface of the main body portion; and a predetermined distance from the substantially planar first roof surface defined by the first arm beam member to the top surface of the main body portion is less than a predetermined distance from the substantially planar second roof surface defined by the second arm beam member to the bottom surface of the main body portion.

22. The hold-down apparatus according to claim 1, wherein:

a predetermined distance from the substantially planar second roof surface defined by the second arm beam member to the bottom surface of the main body portion is less than a distance from the substantially planar first roof surface defined by the first arm beam member to the bottom surface of the main body portion; and a predetermined distance from the substantially planar first roof surface defined by the first arm beam member to the top surface of the main body portion is less than a predetermined distance from the substantially planar second roof surface defined by the second arm beam member to the top surface of the main body portion.

* * * * *